(12) United States Patent
Kim et al.

(10) Patent No.: US 9,294,707 B2
(45) Date of Patent: Mar. 22, 2016

(54) TELEVISION

(71) Applicant: SAMSUNG ELECTRONICS CO., LTD., Suwon-si (KR)

(72) Inventors: Sung Ki Kim, Seoul (KR); Yong Jin Kim, Seoul (KR); Byung Joo Paek, Suwon-si (KR); Jeong Roh Lee, Hwaseong-si (KR); Woo Sung In, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 425 days.

(21) Appl. No.: 13/754,484

(22) Filed: Jan. 30, 2013

(65) Prior Publication Data

US 2013/0222707 A1    Aug. 29, 2013

(30) Foreign Application Priority Data

| Jan. 31, 2012 | (KR) | ........................ 10-2012-0009427 |
| Jan. 31, 2012 | (KR) | ........................ 10-2012-0009428 |
| Jan. 31, 2012 | (KR) | ........................ 10-2012-0009500 |
| Jan. 31, 2012 | (KR) | ........................ 10-2012-0009501 |
| Jan. 31, 2012 | (KR) | ........................ 10-2012-0009502 |
| Jan. 31, 2012 | (KR) | ........................ 10-2012-0009827 |
| Jan. 31, 2012 | (KR) | ........................ 10-2012-0010090 |
| Jan. 4, 2013 | (KR) | ........................ 10-2013-0001110 |

(51) Int. Cl.
*H04N 5/64* (2006.01)

(52) U.S. Cl.
CPC ........................ *H04N 5/64* (2013.01)

(58) Field of Classification Search
USPC ............ 348/836, 730, 725, 723, 133, 87, 80; 361/164, 668, 676, 678, 679.01, 361/679.45, 679.47, 679.52, 688, 696, 701, 361/785; 463/61, 62, 63; 174/15.2, 56, 54, 174/260, 359, 385, 481, 520; 73/644; 710/1, 2

See application file for complete search history.

(56) References Cited

U.S. PATENT DOCUMENTS

| 5,887,435 | A | * | 3/1999 | Morton ............................ 62/3.6 |
| 8,484,678 | B2 | * | 7/2013 | Lee .................... H04N 5/44591 348/563 |
| 2002/0118315 | A1 | * | 8/2002 | Hong ................... H04N 5/4401 348/839 |
| 2003/0090447 | A1 | * | 5/2003 | Kimura ........................... 345/82 |

(Continued)

FOREIGN PATENT DOCUMENTS

| CN | 201378649 Y | 1/2010 |
| WO | 2010/094208 A1 | 8/2010 |

OTHER PUBLICATIONS

Communication dated Feb. 20, 2014 issued by the European Patent Office in counterpart European Patent Application No. 13153270.7.

(Continued)

*Primary Examiner* — Jefferey Harold
*Assistant Examiner* — Mustafizur Rahman
(74) *Attorney, Agent, or Firm* — Sughrue Mion, PLLC

(57) ABSTRACT

A television may include a main body, an additional electronic unit installed at an outside of the main body, at least one port allowing which is configured to connect a connector of a cable for communication with the an additional external electronic unit to the main body be connected thereto; and at least one heat transfer member to receive which is configured to receive and transfer heat transferred from the at least one port.

21 Claims, 21 Drawing Sheets

(56) References Cited

U.S. PATENT DOCUMENTS

| | | |
|---|---|---|
| 2005/0033479 A1* | 2/2005 | Parker .................... 700/282 |
| 2005/0145404 A1* | 7/2005 | Yagi et al. ............... 174/17 VA |
| 2005/0149767 A1* | 7/2005 | Fei .......................... 713/300 |
| 2006/0063595 A1* | 3/2006 | Kondo ..................... 463/46 |
| 2006/0137444 A1* | 6/2006 | Kuzuyama et al. ...... 73/202 |
| 2007/0067515 A1* | 3/2007 | Chen ....................... 710/72 |
| 2008/0055573 A1* | 3/2008 | Chu ......................... 353/122 |
| 2008/0304222 A1* | 12/2008 | Chen ....................... 361/683 |
| 2009/0031387 A1 | 1/2009 | Boyden et al. |
| 2010/0191121 A1* | 7/2010 | Satoh et al. ............. 600/459 |
| 2010/0313590 A1* | 12/2010 | Campbell et al. ....... 62/259.2 |
| 2011/0043979 A1* | 2/2011 | Saito et al. .............. 361/679.01 |
| 2011/0136352 A1 | 6/2011 | Liu et al. |
| 2012/0250735 A1* | 10/2012 | Tang ....................... G06F 13/409 |
| | | 375/219 |

OTHER PUBLICATIONS

Communication issued on May 7, 2015 by the European Patent Office in related Application No. 13153270.7.

* cited by examiner

300

TELEVISION

CROSS-REFERENCE TO RELATED APPLICATIONS

This application claims priority from Korean Patent Application Nos. 10-2012-0009427, 10-2012-0009428, 10-2012-0009500, 10-2012-0009501, 10-2012-0009502, 10-2012-0009827 and 10-2012-0010090, filed on Jan. 31, 2012, and Korean Patent Application No. 10-2013-0001110, filed on Jan. 4, 2013, in the Korean Intellectual Property Office, the disclosures of which are incorporated herein by reference in their entirety.

BACKGROUND

1. Field

Apparatuses consistent with exemplary embodiments relate to a television having an additional (external) electronic unit and an improved assembly structure.

2. Description of the Related Art

In the related art, a television, which is used to display an image, is one of the most common display devices. The display devices are essential in implementing a portable computer such as a laptop computer and a personal digital assistant (PDA) and a small and light-weight system such as a cell phone in addition to a monitor of a desktop computer.

The types of displays usable for a television include a liquid crystal display (LCD), a plasma display panel (PDP) and a field emission display (FED). These types of displays are in the limelight since they have higher visibility than a cathode ray tube (CRT), and also have lower average power consumption and lower heat dissipation than the CRT with the same screen size.

Recently, there has been a need to connect an additional electronic unit to a television, and the additional electronic unit is often positioned near the television. Further, along with development of a smart television, such additional electronic unit having certain new functions has been developed to be installed at an outdated television that needs to an upgrade. For such outdated television, the additional electronic unit may need to be positioned near the television.

In the related art, when an additional electronic unit is connected to a television, it is usually positioned at a separate space such as a table placed near the television, and a separate item such as a connection cable is used to connect the additional electronic unit to the television.

Further, in case of mounting the television on a wall, the additional electronic unit may need to be fixed to a fixing unit that holds the television to the wall, or a separate component may need to be added to the television for installation of the additional electronic unit.

SUMMARY

One or more exemplary embodiments provide a television that transfers heat from ports to the outside of the television by arranging a heat transfer member to contact the ports and a television that allows an additional electronic unit to be combined with the body of the television.

In accordance with an aspect of an exemplary embodiment, there is provided a television including a main body, at least one port which is configured to connect a connector of an external electronic unit to the main body, and at least one heat transfer member which is configured to receive and transfer heat from the at least one port.

At least one face of the at least one port may contact the at least one heat transfer member.

The at least one heat transfer member may be integrally mounted to the at least one port.

The heat transfer member may include a contact portion to contact the port and an extension portion extending outward from the contact portion.

The at least one heat transfer member may include a contact portion which contacts the at least one port, and an extension portion which extends outward from the contact portion.

The at least one heat transfer member may include an inserting portion into which the at least one port is inserted, and an extension portion which extends outward from the inserting portion.

The at least one port may include a plurality of ports, and the at least one heat transfer member includes a plurality of inserting portions, wherein each of the plurality of ports is inserted into a respective inserting portion.

The plurality of inserting portions may be integrated with one another.

One side of the at least one port positioned on a printed circuit board may be exposed to an exterior of the main body.

The connector of the external electronic unit may include a coupling protrusion which is configured to couple the connector of the external electronic unit to the main body.

The coupling protrusion may be provided on one side of the external electronic unit, and may be configured to be coupled to the at least one port provided on the main body.

The coupling protrusion may be provided on a coupling member coupled to the external electronic unit, and may be configured to be coupled to the at least one port provided on the main body.

In accordance with an aspect of another exemplary embodiment, there is provided a television including a main body, an external electronic unit supported on a rear side of the main body, and at least one port that is provided on a lateral side of the main body and is configured to input and output a signal, wherein the external electronic unit is coupled to the main body through the at least one port.

The at least one port may be exposed to an outside of the main body through a through hole provided at the lateral side of the main body.

The television may further include a coupling protrusion which couples the external electronic unit to the main body, wherein the coupling protrusion may be coupled to the at least one port provided on the one side the main body.

The coupling protrusion may be integrated with the external electronic unit.

The television may further include a coupling member coupled to the external electronic unit and the coupling protrusion may extend from one side of the coupling member.

The television may further include a printed circuit board provided inside the main body and the at least one port may be coupled to one side of the printed circuit board.

The television may further include at least one heat transfer member which contacts at least one side of the port and is configured to receive and transfer heat generated at the at least one port.

In accordance with an aspect of another exemplary embodiment, there is provided a television including a main body, a port which is configured to input and output data and a heat transfer member which contacts the port and dissipates heat generated at the one port.

The heat transfer member may be provided between a rear cover of the television and the port.

The heat transfer member may include a contact portion which contacts the port and an extension portion which extends outward from the contact portion.

The heat transfer member may include an inserting portion into which the port is inserted and an extension portion which extends outward from the inserting portion.

The extension portion may be integrated with the contact portion and the extension portion may not contact the port.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Figure 1:
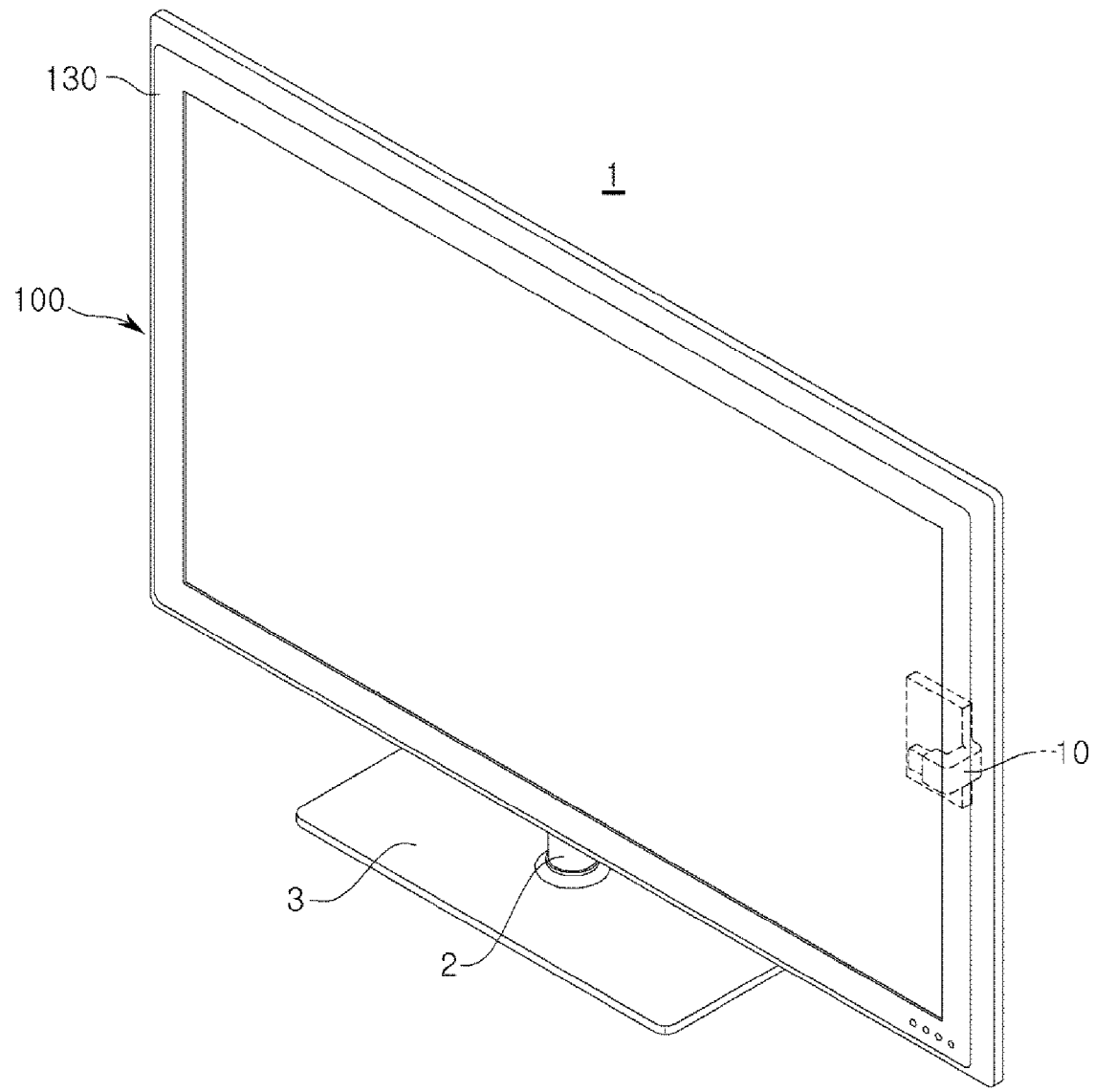
FIG. 1 is a perspective view showing the front of a television in accordance with an exemplary embodiment.

Reference will now be made in detail to exemplary embodiments, examples of which are illustrated in the accompanying drawings, wherein like reference numerals refer to like elements throughout. A description will be given of a case of a stand-type television, but the exemplary embodiments are not limited thereto. The apparatuses consistent with the exemplary embodiments may also be applicable to a wall mounted television.

Figure 2:
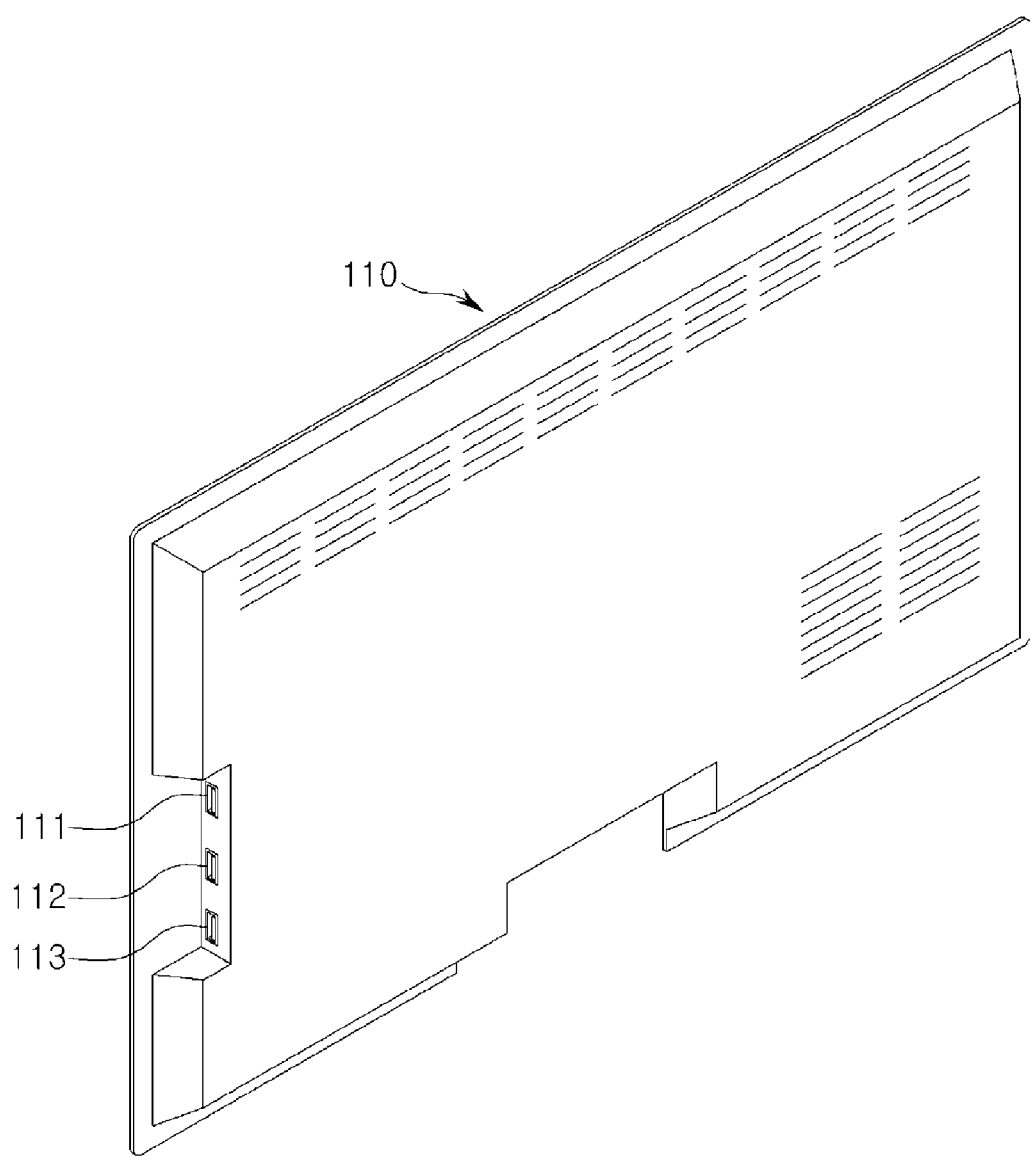
FIG. 2 is a perspective view showing a rear cover of the television of FIG. 1.
Figure 3:
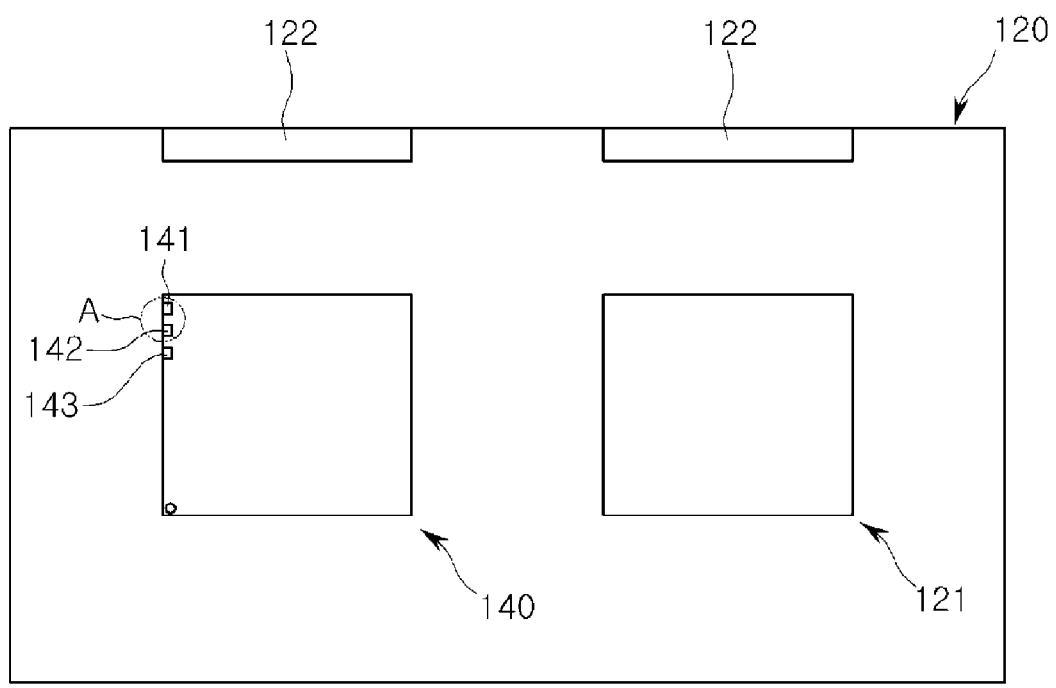
FIG. 3 is a view illustrating various components disposed on a chassis of the television in accordance with the exemplary embodiment.

FIG. 1 is a perspective view showing the front of a television in accordance with an exemplary embodiment, and FIG. 2 is a perspective view showing a rear cover of the television of FIG. 1. FIG. 3 is a view illustrating various components disposed on a chassis of the television in accordance with the exemplary embodiment.

As shown in FIGS. 1, 2 and 3, a television in accordance with the illustrated exemplary embodiment includes a main body 100, a stand 3 to support the main body 100, and a support fixture 2 to fix the body 100 to the stand 3.

The main body 100 includes a display module (not shown) to display an image, a front cover 130 and a rear cover 110. A printed circuit board 140 is installed on the rear of the display module inside the main body 100 to control operation of the television. The display module and the printed circuit board 140 are arranged between the front cover 130 and the rear cover 110.

Also, a plurality of ports 141, 142 and 143 is provided on a portion of the body 100 to allow signals to be input and output through the plurality of ports 141, 142 and 143. The plurality of ports 141, 142 and 143 may be disposed in a lateral direction of the circuit board 140. A plurality of through holes 111, 112 and 113 are arranged on a lateral side of the rear cover 110 such that the ports 141, 142 and 143 may be exposed in the lateral direction of the circuit board 140. The plurality of ports 141, 142 and 143 may include HDMI terminals as well as USB terminals.

In the illustrated exemplary embodiment, an additional electronic unit 10 is provided on the rear side of the main body 100 extending in parallel with the main body 100 such that the additional electronic unit 10 is covered by the body 100 when viewed from the front of the television 1, and is coupled to at least one of the plurality of ports 141, 142 and 143 to be connected to the main body 100. Coupling the additional electronic unit 10 to the at least one of the plurality of ports 141, 142 and 143 is intended to ensure that the additional electronic unit 10 is simply connected to the main body 100 without providing the main body 100 with a separate component for installation of the additional electronic unit 10 to the television 1. The connection of the additional electronic unit 10 to the main body 100 will be described later.

The additional electronic unit 10 allows a user to use newly introduced functions other than the functions the television 1 itself is provided with. The additional functions include, for example, allowing the user to go online or place a video call through the television 1.

As shown in FIG. 3, the chassis 120 includes a drive unit (not shown), an optical unit (not shown), a speaker 122, and a power supply unit 121 to supply electric power to various components provided on the printed circuit board 140. The printed circuit board 140 processes external broadcast signals and signals of images, sound and upgrade data transmitted from an external device and actuates the drive unit (not shown) and optical unit (not shown) based on the processed signals. Also, the speaker 122 outputs an audio signal based on a command from a microcomputer (not shown) provided on the printed circuit board 140. The speaker 122 may be installed at the exterior of the main body 100 of the television 1.

The power supply unit 121 converts alternating current power from an external source into direct current power and adjusts the voltage of the converted direct current power to a voltage level suitable to be applied to respective components. The power supply unit 121 may be implemented by a switching mode power supply (SMPS).

A tuner of the printed circuit board 140 receives a broadcast signal from a broadcast station or satellite through cable or by radio and demodulates the signal. A signal processor of the printed circuit board 140 splits the received broadcast signal into an image signal containing image data, an audio signal containing audio data, and a supplementary signal containing supplementary data. The split signals of image data and audio data are processed and then the supplementary data is transmitted to a graphical user interface (GUI) generator (not shown). The supplementary data includes an electronic program guide (EPG).

The microcomputer on the printed circuit board 140 controls the drive unit (not shown) and light source (not shown) to display on a display module (not shown) images in the image data processed by the signal processor, and allows the audio signal processed by the signal processor to be output through the speaker 122.

The plurality of ports 141, 142 and 143 may be arranged on one side of the printed circuit board 140 to connect various external devices to the printed circuit board 140 using a cable.

Figure 4:
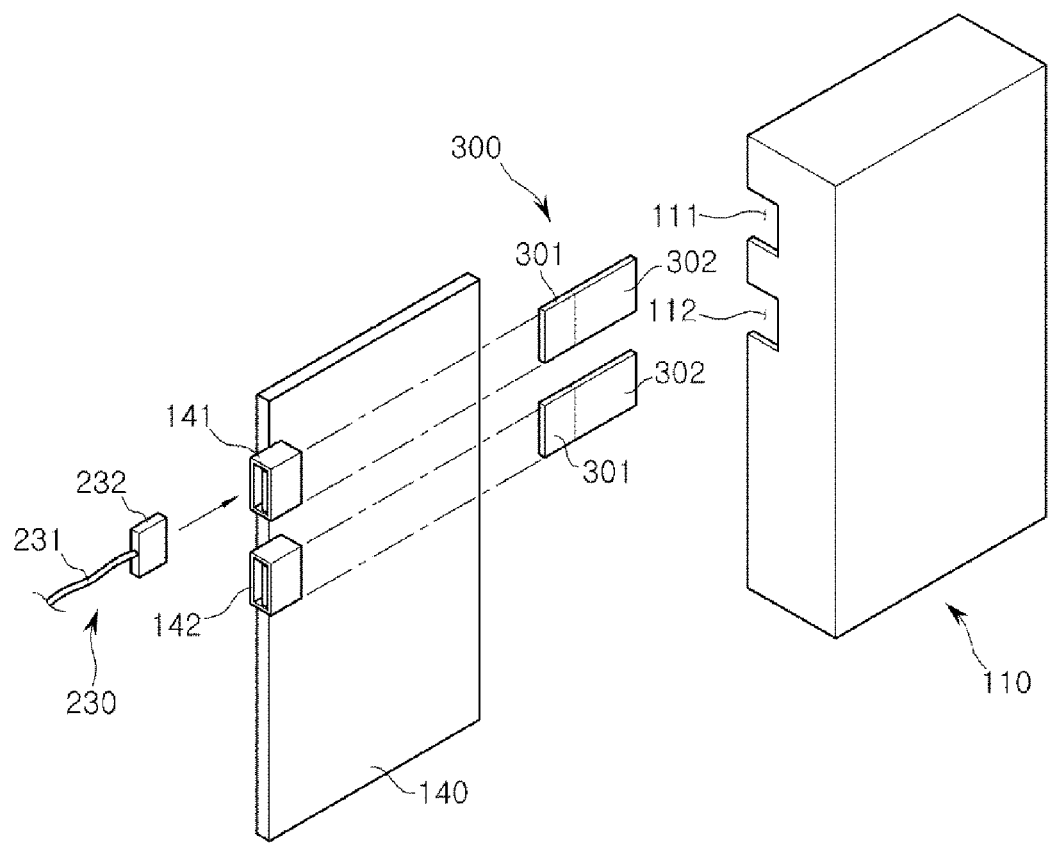
FIG. 4 is a view illustrating details of a printed circuit board of a portion A of FIG. 3 in accordance with an exemplary embodiment.

FIG. 4 is a view illustrating details of a printed circuit board of a portion A of FIG. 3 in accordance with an exemplary embodiment.

FIG. 4 shows the ports 141 and 142 arranged on the printed circuit board 140 in detail, and for convenience of illustration, only two ports are shown. At least a portion of the ports 141 and 142 is exposed to the outside through the through holes 111 and 112 of the rear cover 110 such that various connectors 230 having a connector portion 232 and a cord portion 231 may be easily connected to the ports 141 and 142. The printed circuit board 140 having the ports 141 and 142 is positioned inside the main body 100. Accordingly, the printed circuit board 140 may be protected by the main body 100.

One surface of each of the ports 141 and 142 contacts the printed circuit board 140 and makes electrical and mechanical connection with the printed circuit board 140. Another surface of the each of the ports 141 and 142 contacts a heat transfer member 300 and heat generated from the ports 141 and 142 during input and output of data through the ports 141 and 142 transfers to the heat transfer member 300 such that the heat generated at the ports 141 and 142 is dissipated to the outside.

According to the illustrated exemplary embodiment, the heat transfer member 300 has a plate shape corresponding to the surfaces of the ports 141 and 142 which the heat transfer member 300 contacts, and may include a first contact portion 301 having the same size as the surfaces of the ports 141 and 142. The first contact portion 301 of the heat transfer member 300 may be connected to each of the ports 141 and 142. That is, the first contact portion 301 contacts one surface of the ports 141 and 142 to receive heat generated at the ports 141 and 142 and transfers the heat to the outside.

The heat transfer member 300 may include an extension portion 302 extended to a certain length from the first contact portion 301. The extension portion 302 is integrated with the first contact portion 301, but does not contact the ports 141 and 142. Since the extension portion 302 may increase the overall size of the heat transfer member 300, the extension portion 302 may enhance the rate of heat transfer through the heat transfer member 300 and transfer the heat from the ports 141 and 142 to the outside of the ports 141 and 142.

Also, when a plurality of ports 141 and 142 is provided, an extension to integrate a plurality of first contact portions 301 may be provided by connecting one end of each of the first contact portions 301 contacting the ports 141 and 142 to each other.

FIGS. 5A-5E is a view illustrating heat transfer members in accordance with various exemplary embodiments.

Figure 5A:
FIGS. 5A-5E are views illustrating heat transfer members in accordance with various exemplary embodiments.

As shown in FIG. 5A, a heat transfer member 300 may be formed of a metal such as aluminum (Al), silver (Ag), copper (Cu), iron (Fe), tungsten (W) and gold (Au) through which conductive heat transfer may occur. As an alternative, the heat transfer member 300 may be formed of a nonmetallic material such as graphite through which heat transfer may occur. Further, the heat transfer member 300 may be formed of a thermally conductive resin.

Figure 5B:

As shown in FIG. 5B, a heat transfer member 310 may be formed by laminating layers of two different thermal interface materials.

For example, the heat transfer member 310 may include a thermally conductive metal 312 and a thermally conductive nonmetal 311. An exemplary embodiment of the heat transfer member 310 may include aluminum laminated with a carbon material.

Also, the heat transfer member 310 may include a metal or nonmetal, and a phase change material applied to the metal or nonmetal.

Figure 5C:

As shown in FIG. 5C, a heat transfer member 320 may include a thermally conductive film 321 and a phase change material 322 accommodated in the thermally conductive film 321.

The thermally conductive film 321 is formed of polyethylene terephthalate (PET), and seals the phase change material 322.

Figure 5D:
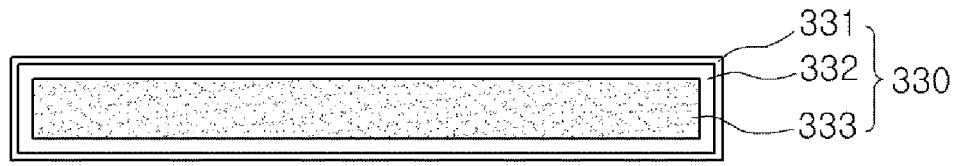

As shown in FIG. 5D, a heat transfer member 330 may include a coating layer 331 of a metal such as aluminum. The metallic coating layer 331 is formed on the outer surface of the thermally conductive film 332.

It is also possible that the heat transfer member 330 contacts the rear cover 110 to transfer part of the heat reaching the rear cover 110.

The phase change material 333 may be accommodated in the rear cover 110. In this case, the rear cover 110 may contact the ports to receive heat from the ports and distribute the heat through the phase change material 333.

The heat transfer member 330 may shield electromagnetic interference (EMI) generated at the ports, and may dissipate heat radiated from the printed circuit board 140. In addition, the heat transfer member 330 may be formed of a material that may shield EMI.

Figure 5E:
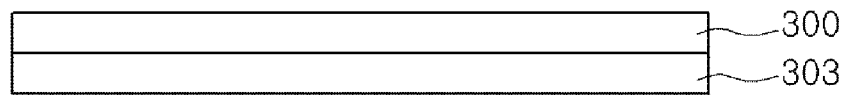

As shown in FIG. 5E, the heat transfer member 300 may further include an adhesive film 303 positioned between the ports 141 and 142 and the heat transfer member 300 to allow the heat transfer member 300 to adhere to the ports 141 and 142. The adhesive film 303 may include at least one of thermal grease, gap pad and double sided adhesive tape.

If the adhesive film 303 is a double-sided adhesive tape, the double-sided adhesive tape allows the heat transfer member 300 to adhere to the ports 141 and 142. The double-sided adhesive tape may be formed of a thermally conductive material.

Figure 6:
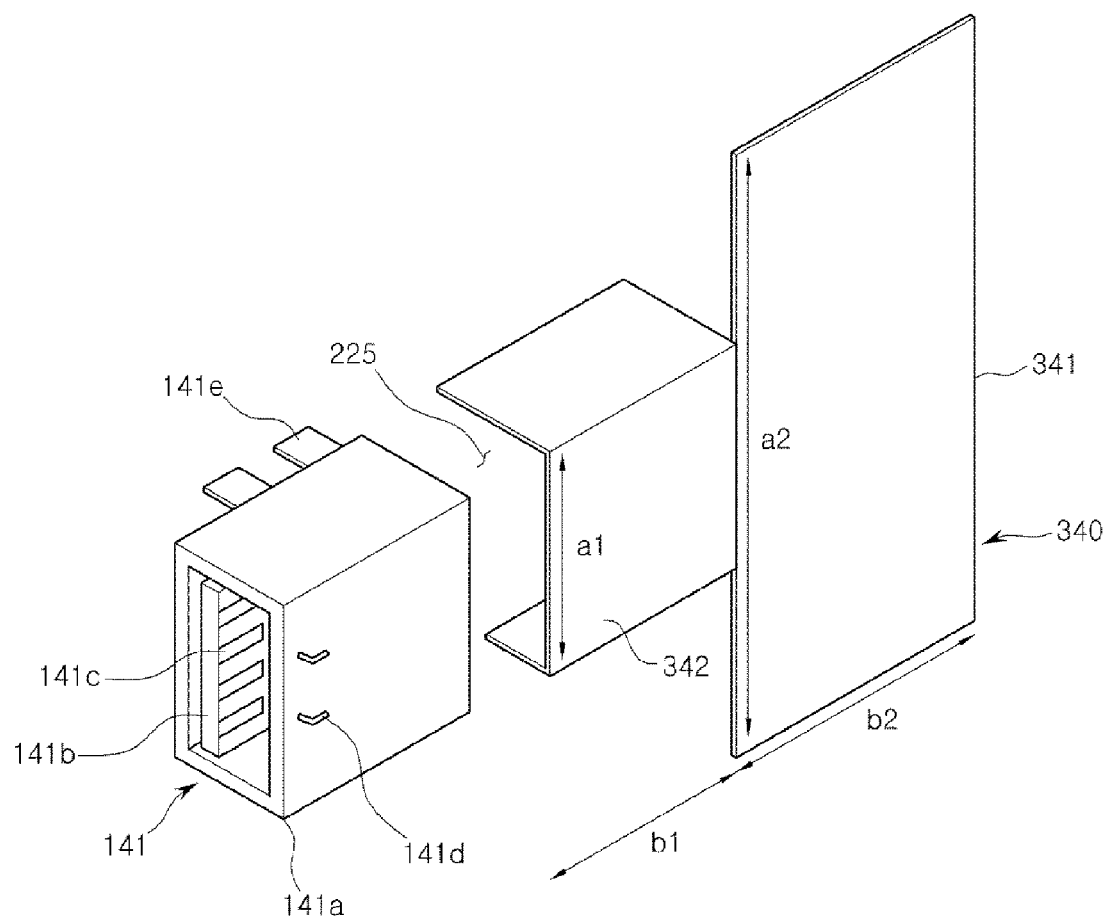
FIG. 6 is a view illustrating a port and a heat transfer member in accordance with another exemplary embodiment.
Figure 7:
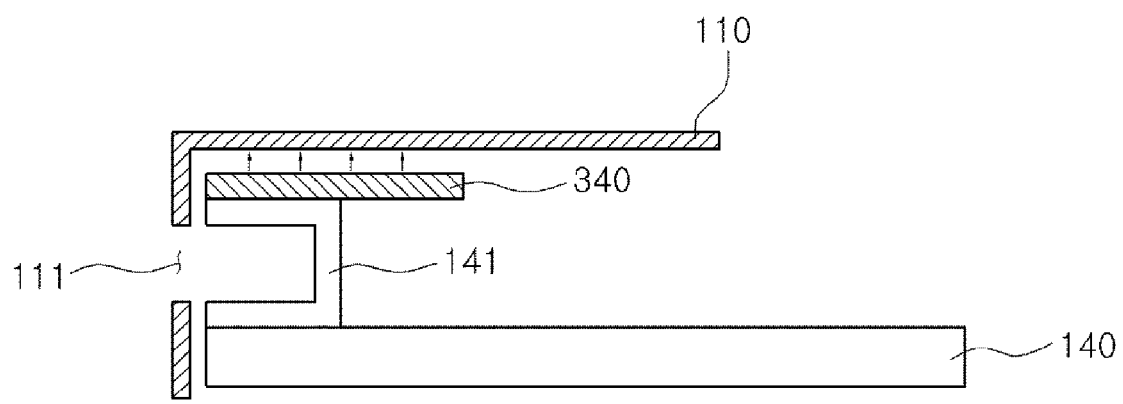
FIG. 7 is a cross-sectional view illustrating the port and the heat transfer member of FIG. 6 positioned inside a cover.

FIG. 6 is a view illustrating a port 141 and a heat transfer member 340 in accordance with another exemplary embodiment, and FIG. 7 is a cross-sectional view illustrating the port 141 and the heat transfer member 340 of FIG. 6 positioned inside a cover.

As shown in FIG. 6, the port 141 includes a housing portion 141*a*, and a connection portion 141*b* provided in the housing portion 141*a* to be inserted into the connector 230. Also, the port 141 may include a plurality of pins 141*c* arranged within the connection portion 141*b* yet exposed to the outside to contact pins in the connector 230, a fixing portion 141*d* to fix the connector 230 and inserted into the housing portion 141*a*, and a mounting portion 141*e* partially protruding outward from the housing portion 141*a* to allow the housing portion 141*a* to be mechanically mounted on the printed circuit board 140.

The housing portion 141a includes a first face which contacts the printed circuit board 140, a second face arranged in a parallel direction to face the first face, a third and fourth face perpendicularly extending from both lateral ends of the first and second faces to connect the first and second faces to each other.

Also, the housing portion 141a is provided with a groove formed at one side of the housing portion 141a to allow the connector 230 to be inserted into the housing portion 141a, a plurality of pins 141c arranged within the connection portion 141b protrudes outward from a face positioned opposite the face having the groove of the housing portion 141a. The pins 141c are electrically connected to the printed circuit board 140.

The heat transfer member 340 is formed in a shape corresponding to a shape of the port 141. That is, the heat transfer member 340 is formed in the shape of the second, third and fourth faces of the housing portion 141a. As an example, the heat transfer member 340 may include a first inserting portion 342 provided with both ends bent to form a bracket shape and having dimensions corresponding to those of the second, third and fourth faces of the housing portion 141a. Specifically, the bent portions of the heat transfer member corresponds to the third and fourth faces of the housing portion 141a and a portion of the bracket shape where the both ends are bent corresponds to the second face of the housing portion 141a.

The first inserting portion 342 includes an accommodation groove 225 having dimensions corresponding to dimensions of the port 141 to allow the port 141 to be inserted into the accommodation groove 225. When the port 141 is inserted into the accommodation groove 225, the first inserting portion 342, which is a heat transfer member, contacts the second, third and fourth faces of the port 141 to be coupled with the second, third and fourth faces of the port 141. That is, the first inserting portion 342 surrounds three outer faces of the port 141 inserted into the accommodation groove 225 to receive heat transferred from the three outer faces of the port 141.

The heat transfer member 340 may also include an extension portion 341 extending from the first inserting portion 342. The extension portion 341 has a height (a2) greater than a height (a1) of a face contacting the second face of the port 141, and extends in a lateral direction which is perpendicular to the height (a1) of the face contacting the second face of the port 141. That is, the extension portion 341 is formed in the shape of a plate extending further to a certain length (b2) from a lateral length (b1) of the face contacting the second face of the port 141. The extension portion 341 may improve the rate of heat conduction by distributing heat transferred from the port 141 to the first inserting portion 342.

In addition, the first inserting 342 portion may be arranged to allow the ports 141 and 142 to be accommodated in the accommodation groove 225 of the heat transfer member 340. The first inserting portion 342 has an area having dimensions corresponding to the areas of the second faces of the ports 141 and 142 and the distances between the ports 141 and 142 so as to accommodate the ports 141 and 142. As the first inserting portion 342 is provided with the accommodation portion 225 having dimensions corresponding to dimensions of the ports to allow the ports to be inserted together into the accommodation groove 225, the first inserting portion 342 contacts the outer surfaces of the ports to be coupled to the ports.

As shown in FIG. 7, the heat transfer member 340 is spaced a certain distance from the printed circuit board 140 facing the printed circuit board 140, and the port 141 is positioned between the heat transfer member 340 and the printed circuit board 140. Also, the heat transfer member 340 is positioned to be spaced a certain distance apart from the rear cover 110.

The heat transfer member 340 receives heat transferred from the port 141 to distribute the heat. Thereby, the heat generated from the port 141 may be prevented from being transferred to the printed circuit board 140 and to the rear cover 110. Therefore, a user may be able to avoid unpleasantness of touching a heated rear cover 110.

In addition, as the heat from the port 141 is allowed to be distributed to a wider area through the extension portion 341 of the heat transfer member 340, transfer of the heat to the rear cover 110 may be further reduced.

Figure 8:
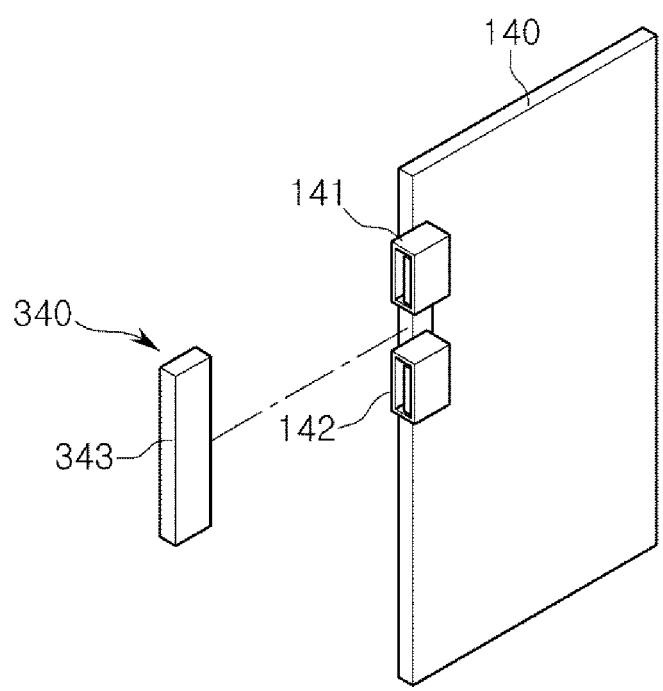
FIG. 8 is a view illustrating details of a printed circuit board in accordance with another exemplary embodiment.
Figure 9:
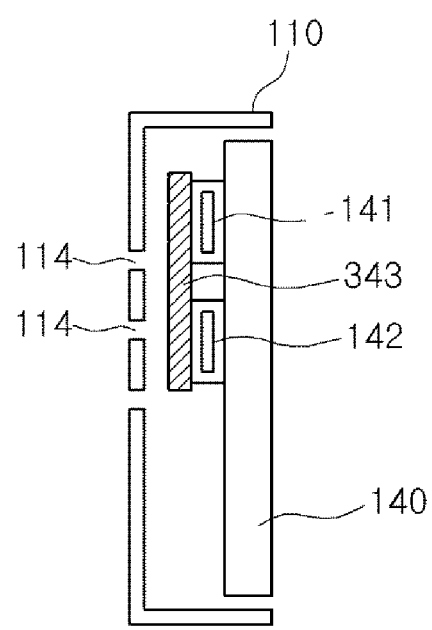
FIG. 9 is a cross-sectional view illustrating a port and a heat transfer member positioned inside a cover in accordance with another exemplary embodiment.

FIG. 8 is a view illustrating details of a printed circuit board 140 in accordance with another exemplary embodiment, and FIG. 9 shows a cross-section of the ports 141 and 142 and a heat transfer member 343 positioned inside a rear cover 110 in accordance with another exemplary embodiment.

As shown in FIGS. 8 and 9, a heat transfer member may include a second contact portion 343 which is capable of transferring heat from a plurality of ports 141 and 142 at the same time.

The second contact portion 343 may contact the second faces of the ports 141 and 142 spaced a distance apart from each other. In case that a heat transfer member as above is integrated with the ports 141 and 142 to receive heat from the ports 141 and 142, heat may be distributed through a wider area than that of the first contact portion 301 during input and output of data through one of the ports 141 and 142.

Further, since the heat generated at one port 141 is transferred through the second contact portion 343, and at the same time some of the heat transferred to second contact portion 343 is also transferred to the housing of the other port 142, the heat generated from the port 141 is dissipated through the other port 142 as well, and therefore the rate of heat conduction may be maximized, and the heat generated at the port 141 through which data is input and output may be minimized.

Also, the rear cover 110 may include a hole 114 to dissipate heat generated from the second contact portion 343 to the outside.

Figure 10:
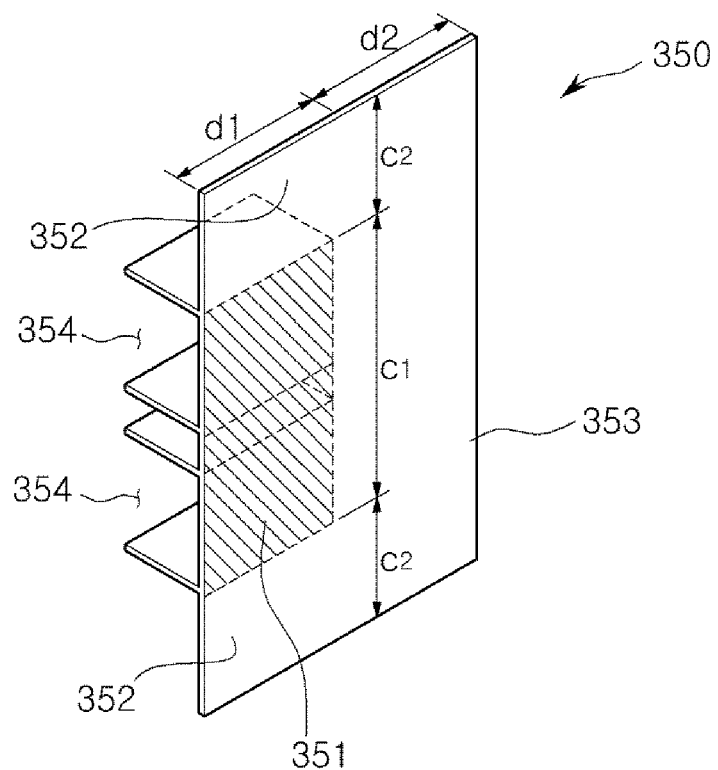
FIGS. 10 and 11 are views illustrating heat transfer members in accordance with other exemplary embodiments.

FIG. 10 is a view illustrating a heat transfer member 350 in accordance with another exemplary embodiment.

As shown in FIG. 10, the heat transfer member 350 is formed in a shape that may accommodate a plurality of ports 141 and 142 spaced a distance apart from each other. According to the exemplary embodiment shown in FIG. 10, the heat transfer member 350 may be provided with a second inserting portion 351 having a plurality of accommodation grooves 354 to accommodate the ports 141 and 142 respectively.

The second inserting portion 351 is formed in a bracket shape by bending both ends of a plate, and is provided with partitions between the bent portions to divide the internal space into a plurality of sub-spaces. Thereby, the plurality of accommodation grooves 354 is provided in the second inserting portion 351. Accordingly, the ports 141 and 142 are respectively allowed to be inserted into the heat transfer member 350.

The dimensions of the accommodation grooves 354 formed in the second inserting portion 351 correspond to respective dimensions of the ports 141 and 142. When the ports 141 and 142 are respectively inserted into the accommodation grooves 354 of the second inserting portion 351, the second inserting portion 351 contacts the second, third and fourth faces of the ports 141 and 142 and is integrated with the ports 141 and 142.

The heat transfer member 350 may further include extension portions 352 and 353, each of which extends to a certain length from the second inserting portion 351. The extension portions 352 and 353 may include a first extension portion 352 and a second extension portion 353. The first extension portion 352 is formed in the shape of a plate extending further to a certain length (c2) from a height (c1) of the second inserting portion 351 from both ends of the second inserting portion 351. The second extension portion 353 is arranged to extend in a lateral direction to a certain length (d2) from a lateral length (d1) of the second inserting portion 351. That is, as shown in FIG. 10, if both the first extension portion 352 and second extension portion 353 are provided, the extension portions 352 and 353 are arranged at all ends of the second inserting portion 351 except the end at which a groove allowing the connector 230 to be inserted into the ports 141 and 142 is formed. By the first extension portion 352 and second extension portion 353, heat generated at the ports 141 and 142 may be transferred in multiple directions, and thereby the rate of heat conduction may be further enhanced.

Figure 11:
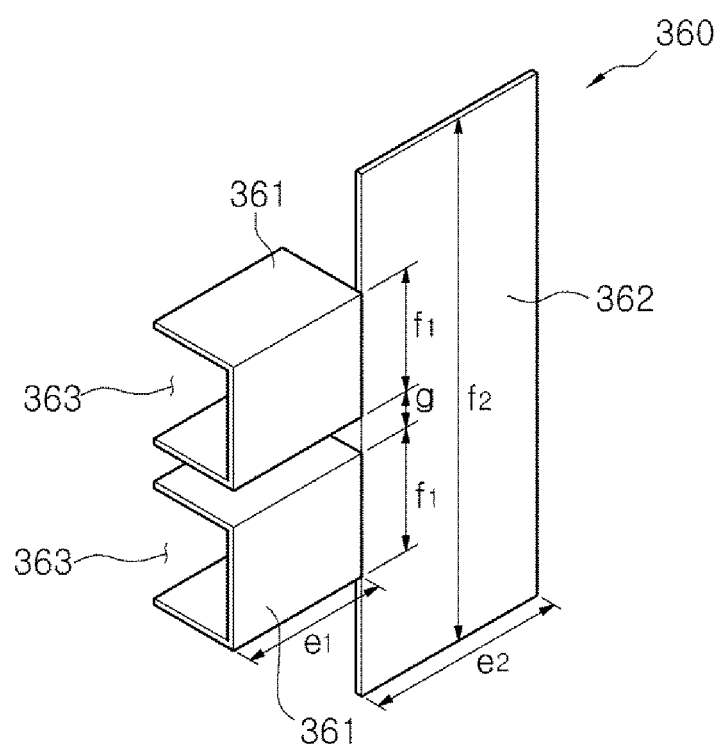

FIG. 11 is a view illustrating a heat transfer member 360 in accordance with another exemplary embodiment.

As shown in FIG. 11, a heat transfer member 360 may include a plurality of third inserting portions 361 and an extension portion 362 extending in a lateral direction from the plurality of third inserting portions 361 such that the third inserting portions 361 are connected to each other.

Each of the plurality of third inserting portions 361 includes an accommodation groove 363 allowing a corresponding port to be inserted into the accommodation groove 363. As the corresponding port is inserted into the accommodation groove 363, the each of the plurality of third inserting portions 361 is coupled to the corresponding port to receive heat transferred from the port and dissipate the heat to the outside. Also, when the corresponding port is inserted into the accommodation groove 363, the each of the plurality of third inserting portion 361 of the heat transfer member 360 contacts the second, third and fourth faces of the corresponding port. By surrounding the second, third and fourth faces of the corresponding port inserted into the accommodation groove 363, the each of the plurality of third inserting portion 361 receives heat from the second, third and fourth faces of the port.

Each of the third inserting portions 361 is spaced apart from each other by a distance (g) corresponding to a distance the corresponding ports are spaced apart from each other, and is connected to each other by an extension portion 362 mounted at one end of the each of the third inserting portions 361. The extension portion 362 extends in a height-wise direction such that a height (f2) of the extension portion 362 is greater than a sum of a height (f1) of the each of the third inserting portions and the distance (g), and is also formed in the shape of a plate extending in a lateral direction to a certain length (e2) from a lateral length (e1) of the third inserting portions 361. As heat transferred to the third inserting portions 361 from the ports is in turn transferred to the extension portion 362, the rate of heat conduction may be improved. The heat transfer member 360 may contact electronic components other than the ports to receive and transfer heat from the electronic components. In addition, it is also possible for the heat transfer member 360 to contact both the ports and other electronic components to dissipate heat from both the ports and electronic components to the outside at the same time.

Figure 12:
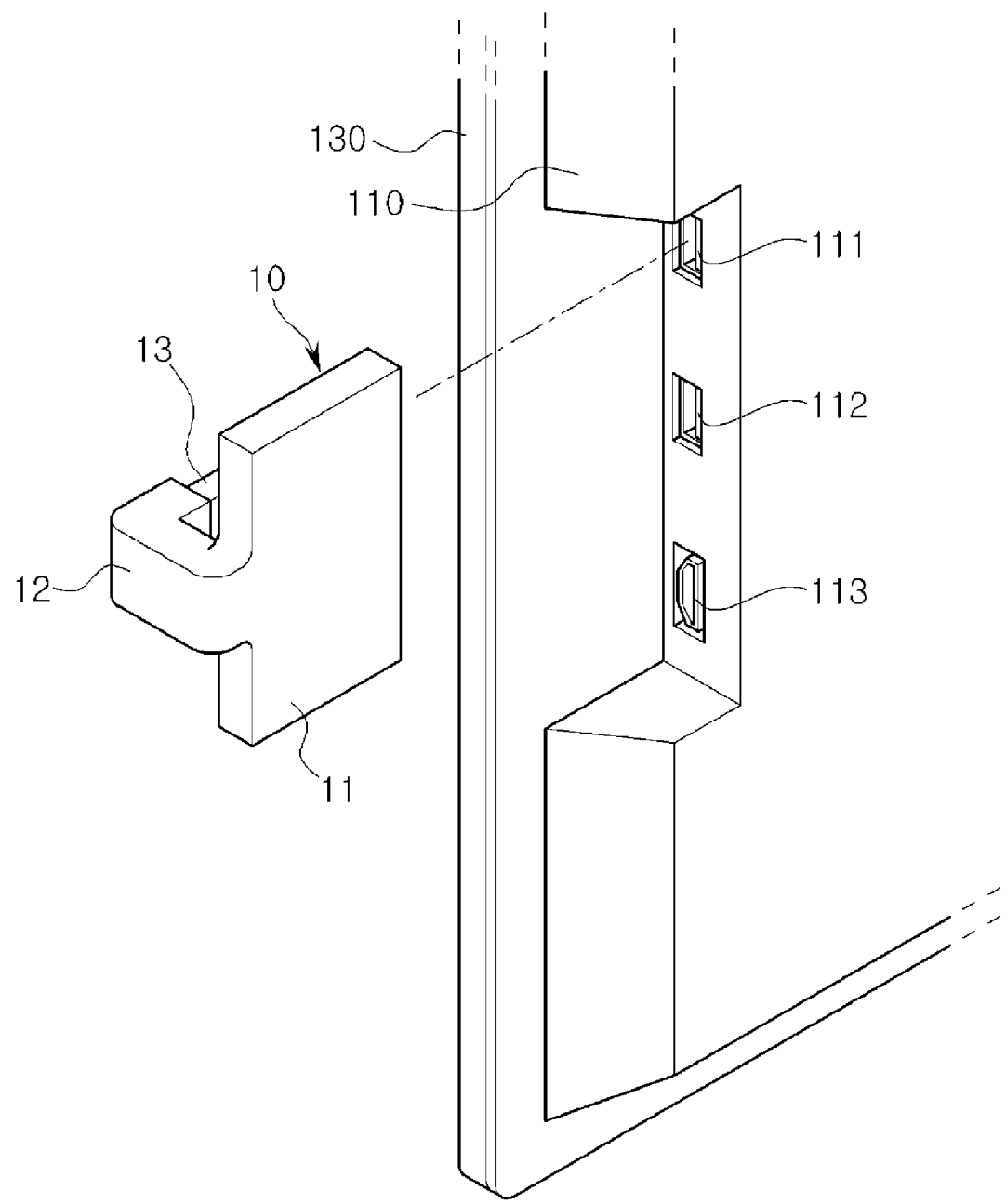
FIG. 12 is a perspective view illustrating an additional electronic unit and a main body separated from each other in accordance with an exemplary embodiment.
Figure 13:
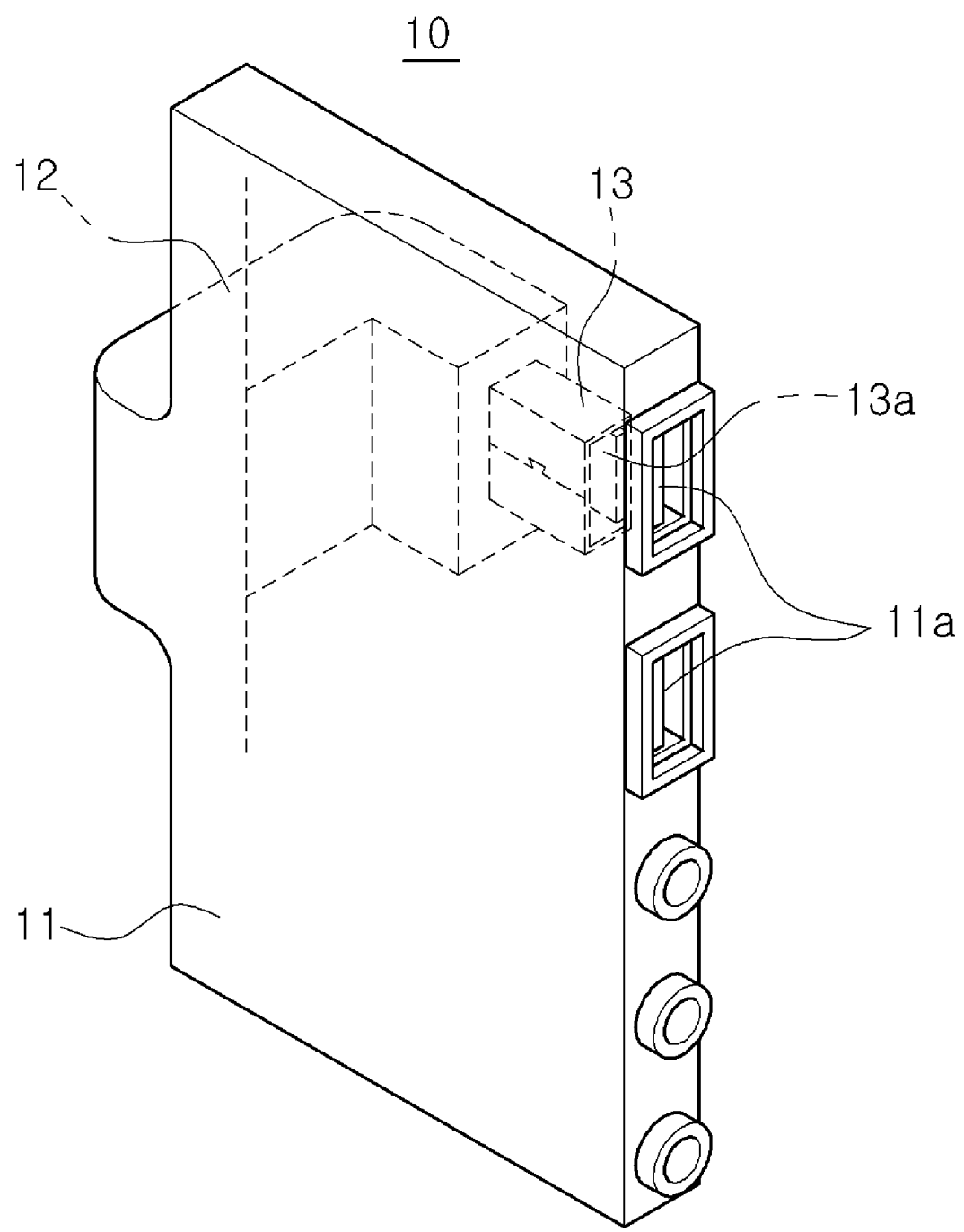
FIG. 13 is a view illustrating the additional electronic unit of FIG. 12.

FIG. 12 is a perspective view illustrating an additional electronic unit 10 and a main body 100 separated from each other in accordance with an exemplary embodiment, and FIG. 13 is a view illustrating the additional electronic unit 10 of FIG. 12.

As shown in FIGS. 12 and 13, the additional electronic unit 10 includes a body 11 having a printed circuit board (not shown) to control operations of the additional electronic unit 10, and a neck portion 12 extending from the body 11, and a coupling protrusion 13 provided at a leading end of the neck portion 12 to be inserted into one of the through holes 111, 112 and 113 and coupled to one of the ports 141, 142 and 143. A plurality of additional ports 11a is provided on one side of the body 11 to allow signals to be input to and output from the additional electronic unit 10.

In the illustrated exemplary embodiment, the through holes 111, 112 and 113 are disposed in a lateral side of the main body 100 as shown in FIG. 12. To dispose the additional electronic unit 10 on the rear side of the main body 100 in a direction parallel with the main body 100, the neck portion 12 of the additional electronic unit 10 is adapted to extend from one end of the body 11 to a leading end of the neck portion 12 in the L shape. Thereby, the coupling protrusion 13 provided at the leading end of the neck portion 12 may be coupled to the through holes 111, 112 and 113 of the main body 100.

The coupling protrusion 13 is provided with a connection portion 13a allowing the additional electronic unit 10 to be electrically connected with at least one of the ports 141, 142 and 143. Accordingly, the coupling protrusion 13 serves not only to couple the additional electronic unit 10 to the main body 100 but also to electrically connect the additional electronic unit 10 to the printed circuit board 140 in the main body 100 through the ports 141, 142 and 143.

The illustrated exemplary embodiment has one coupling protrusion 13 and one neck portion 12, but exemplary embodiments are not limited thereto. If the additional electronic unit 10 weighs over a certain level, the body 11 of the additional electronic unit 10 may be provided with a pair of neck portions 12 arranged in parallel and coupling protrusions 13 are respectively arranged at the leading ends of the two neck portions 12 such that the coupling protrusions 13 are coupled to the respective ports 141, 142 and 143, and thereby the weight of the additional electronic unit 10 is distributed to and supported by the two ports.

In the illustrated exemplary embodiment, the ports 141, 142 and 143 are arranged to face a lateral direction of the main body 100, and the neck portion 12 of the additional electronic unit 10 is adapted to extend in the L shape from one end of the body 11 to a leading end which couples with the ports 141, 142 and 143. However, exemplary embodiments are not limited thereto. For example, the ports 141, 142 and 143 may be disposed to face away from the rear side of the main body 100, and the neck portion of the additional electronic unit may be adapted to extend from the lower end of the body toward the front.

Figure 14:
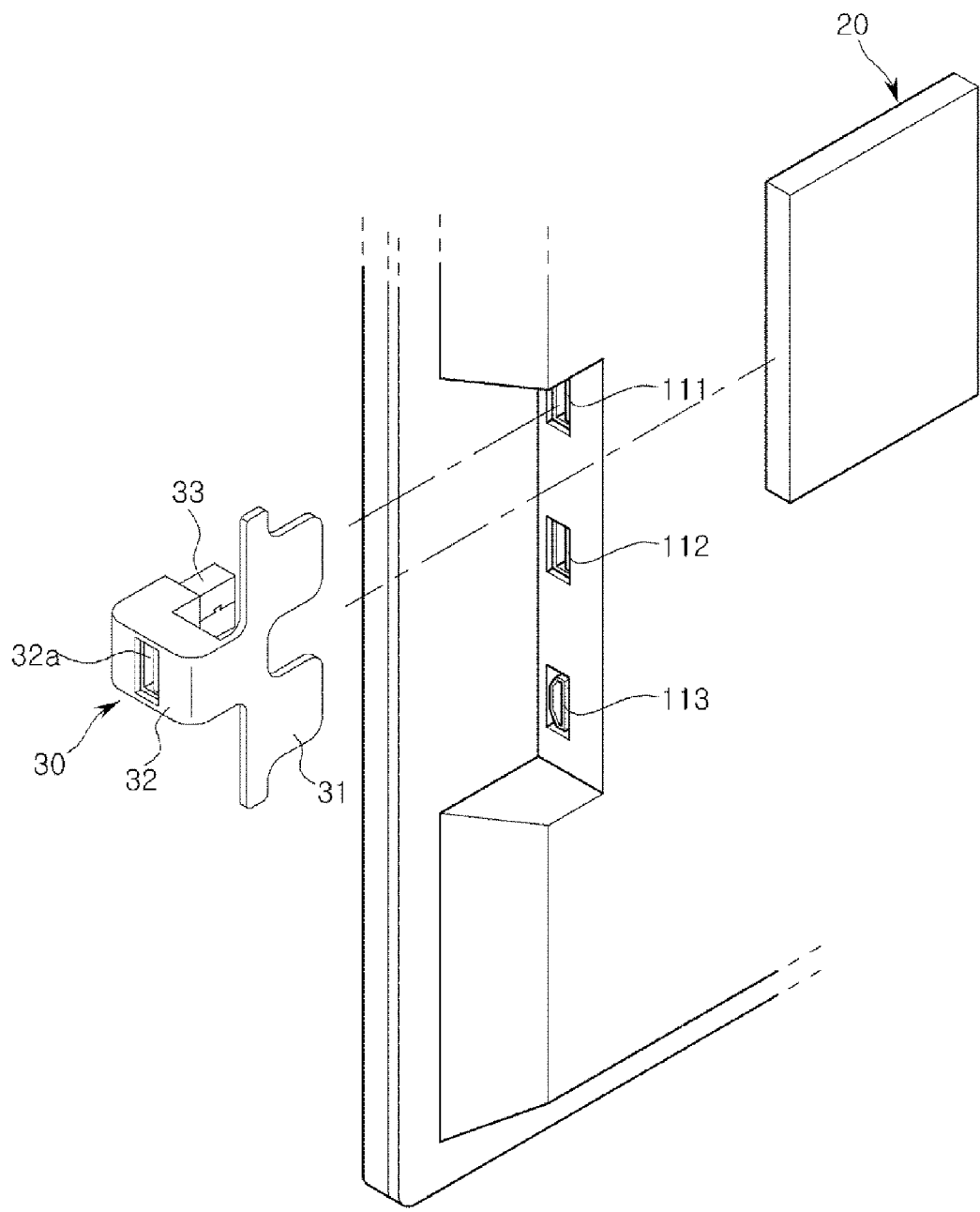
FIG. 14 is a perspective view illustrating an additional electronic unit and a main body separated from each other in accordance with another exemplary embodiment.

FIG. 14 is a perspective view illustrating an additional electronic unit 20 and a main body 100 separated from each other in accordance with another exemplary embodiment.

According to the embodiment shown in FIG. 14, the additional electronic unit 20 is coupled to the main body 100 through a separately provided elastic support member 30. The elastic support member 30 presses the additional electronic unit 20 against the rear surface of the main body 100 such that the additional electronic unit 20 may be used while being supported against the rear surface of the main body 100. The elastic support member 30 is a coupling member to couple the additional electronic unit 20 to the main body 100.

The additional electronic unit 20 is pressed against the rear surface of the main body by the elastic support member 30, which is coupled to the through holes 111, 112 and 113 of the main body 100. Since the additional electronic unit 20 is supported against the rear surface of the main body 100 by the elastic support member 30, the additional electronic unit 20 is allowed to remain in close contact with the rear surface of main body 100 when in use, without providing holes in the main body 100.

The elastic support member 30 includes a pressing portion 31 to press and support the additional electronic unit 20, a neck portion 32 extending from the pressing portion 31, and a coupling protrusion 33 provided at a leading end of the neck portion 32 to be coupled to the ports 141, 142 and 143.

In the illustrated exemplary embodiment, the pressing portion 31 is formed of an elastically deformable material to apply force to the additional electronic unit 20, and when the coupling protrusion 33 is coupled to the through holes 111, 112 and 113, the distance between the rear cover 110 of the main body 100 and the pressing portion 31 is smaller than the thickness of the additional electronic unit 20. When the additional electronic unit 20 is inserted between the rear cover 110 of the main body 100 and the pressing portion 31, the pressing portion 31 is elastically deformed, and the additional electronic unit 20 is pressed against the rear cover 110 of the main body 100 by the elastic restoring force of the pressing portion 31, and thereby the additional electronic unit 20 is allowed to remain supported against the rear surface of the main body 100.

To allow the additional electronic unit 20 to be disposed on the rear side of the main body 100 in a direction parallel with the main body 100, the neck portion 32 of the elastic support member 30 is adapted to extend from one end of the pressing portion 31 to the leading end in the L shape. Accordingly, the coupling protrusion 33 provided at the leading end of the neck portion 32 is allowed to be coupled to the ports 141, 142 and 143.

A connection portion (not shown) allowing the additional electronic unit 20 to be electrically connected with the ports 141, 142 and 143 may be provided at the coupling protrusion 33 of the elastic support member 30, and thereby the elastic support member 30 and the additional electronic unit 20 may be electrically connected with the printed circuit board 140 in the main body 100 through the connection portion (not shown). An additional port 32a through which signals are input to and output from the additional electronic unit 20 may be provided at the neck portion 32 of the elastic support member 30 to replace the ports 141, 142 and 143 to which the elastic support member 30 is coupled.

Thereby, the elastic support member 30 may not only serve to maintain the additional electronic unit 20 disposed at the rear surface of the main body 100, but also serve as a hub.

According to the illustrated exemplary embodiment, the elastic support member 30 is provided with one coupling protrusion 33. However, exemplary embodiments are not limited thereto. A plurality of coupling protrusions 33 may be formed at the elastic support member 30 to be coupled to the ports 141, 142 and 143.

Figure 15:
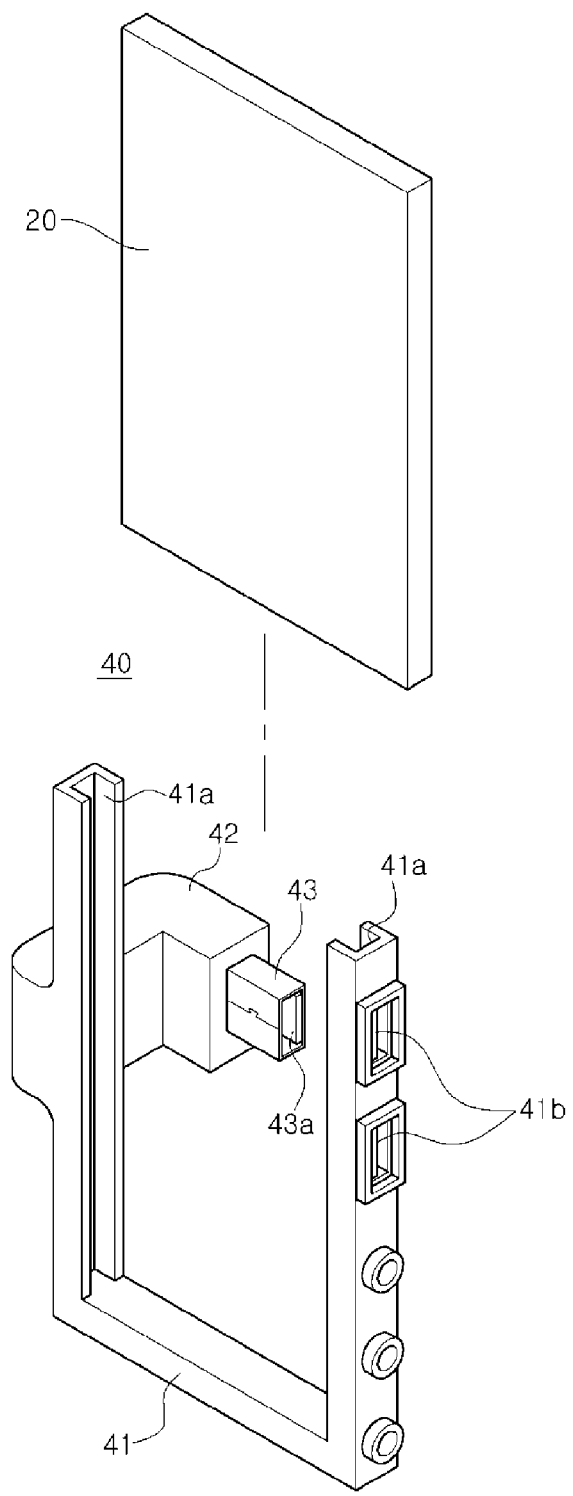
FIG. 15 is a view illustrating an additional electronic unit in accordance with another exemplary embodiment.

FIG. 15 is a view illustrating an additional electronic unit 20 in accordance with another exemplary embodiment.

According to the exemplary embodiment illustrated in FIG. 15, an installation bracket 40 is used to couple the additional electronic unit 20 to the main body 100.

The installation bracket 40 includes an accommodation portion 41 to accommodate the additional electronic unit 20, a neck portion 42 extending from the accommodation portion 41, and a coupling protrusion 43 provided at a leading end of the neck portion 42 to be coupled to the ports 141, 142 and 143.

In the illustrated exemplary embodiment, the accommodation portion 41 is provided with a pair of guide slots 41a arranged to face each other and to allow the additional electronic unit 20 to be slidably inserted between the pair of guide slots 41a and vertically movable such that the additional electronic unit 20 is detachably installed in the accommodation portion 41.

The shape of the neck portion 42, the connection portion 43a provided at the coupling protrusion 43, and an additional port 41b are the same as those in the exemplary embodiments illustrated in FIGS. 12 to 14, and therefore a description thereof will be omitted.

Although the illustrated exemplary embodiment illustrates that installation bracket 40 is provided with one coupling protrusion 43, exemplary embodiments are not limited thereto. The installation bracket 40 may be provided with a plurality of coupling protrusions 43 disposed on at least one neck portion 42 to be coupled to the ports 141, 142 and 143 respectively.

Figure 16:
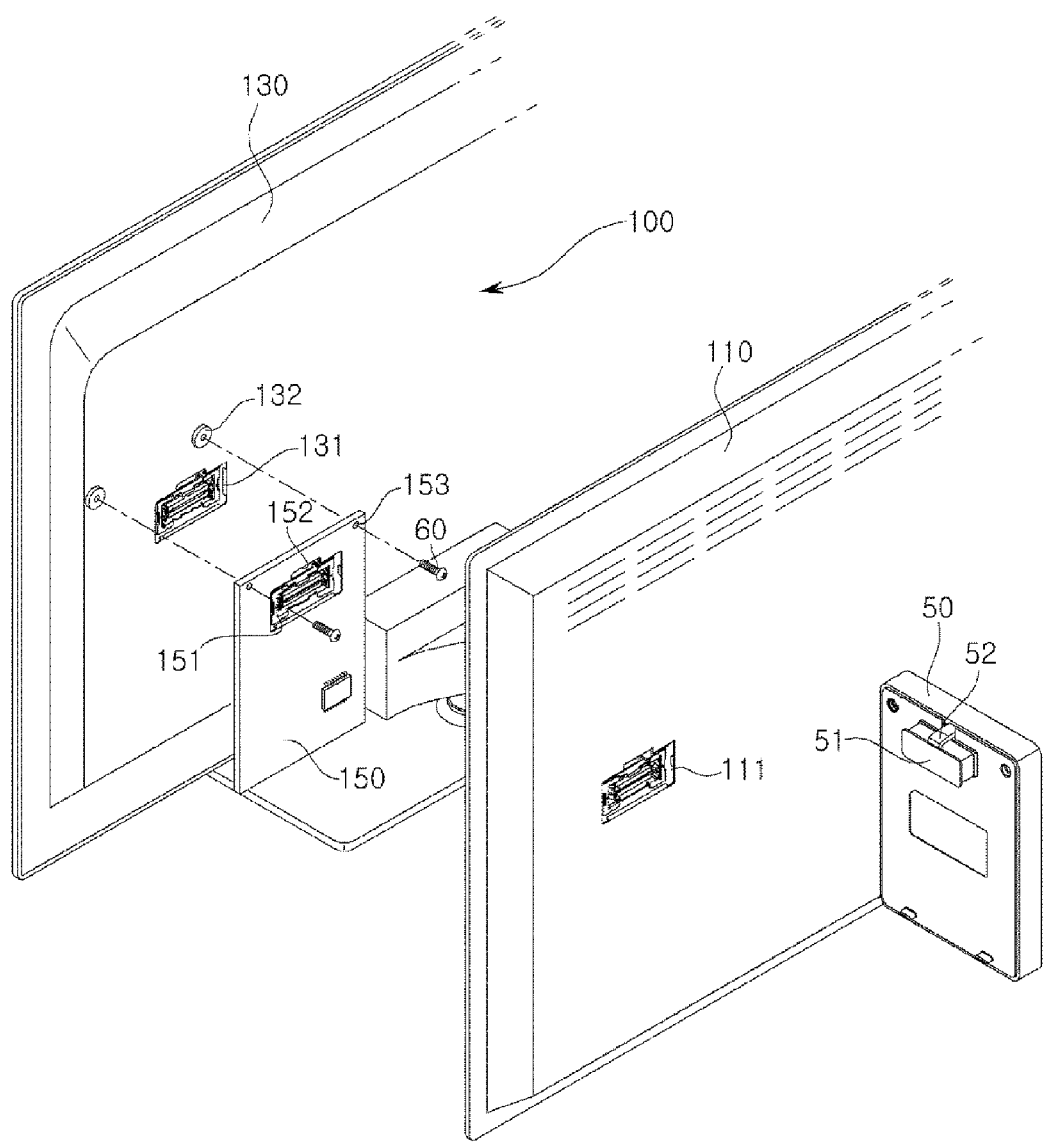
FIG. 16 is an exploded view illustrating an additional electronic unit separated from a television body in accordance with another exemplary embodiment.

FIG. 16 is an exploded view illustrating an additional electronic unit 50 and a main body 100 separated from each other in accordance with another exemplary embodiment.

According to the exemplary embodiment shown in FIG. 16, a coupling protrusion 51 is provided on a rear surface of the additional electronic unit 50. Also, a through hole 111 in which a port 151 is positioned is arranged at the front surface of the rear cover 110. Thereby, the through hole 111 is positioned on the rear surface of the main body 100, and the port 151 is positioned inside the through hole 111, and thus a part of the port 151 is exposed to the outside. Since the port 151 is positioned on the rear surface of the main body 100, the additional electronic unit 50 may not need a neck portion to be coupled to a lateral side of the main body 100 as in other previous exemplary embodiments.

In addition, a protrusion 52 may be provided, separately from the coupling protrusion 51, on one side of the additional electronic unit 50. The protrusion 52 may adjoin the coupling protrusion 51 to guide the coupling protrusion 51 such that the coupling protrusion 51 is attached to or detached from the main body 100. That is, the protrusion 52 is formed of an elastically deformable material and accordingly the additional electronic unit 50 is easily coupled to and decoupled from the main body 100 by pressing the protrusion 52. According to the exemplary embodiment illustrated in FIG. 16, the protrusion 52 is arranged on the upper side of the coupling protrusion 51.

According to the illustrated exemplary embodiment, the coupling protrusion 51 is integrally provided on the additional electronic unit 50, and thus the additional electronic unit 50 may be easily coupled to and decoupled from the main body 100. Also, the configuration of the coupling portion including the coupling protrusion 51 is simple compared to other exemplary embodiments.

Figure 17:
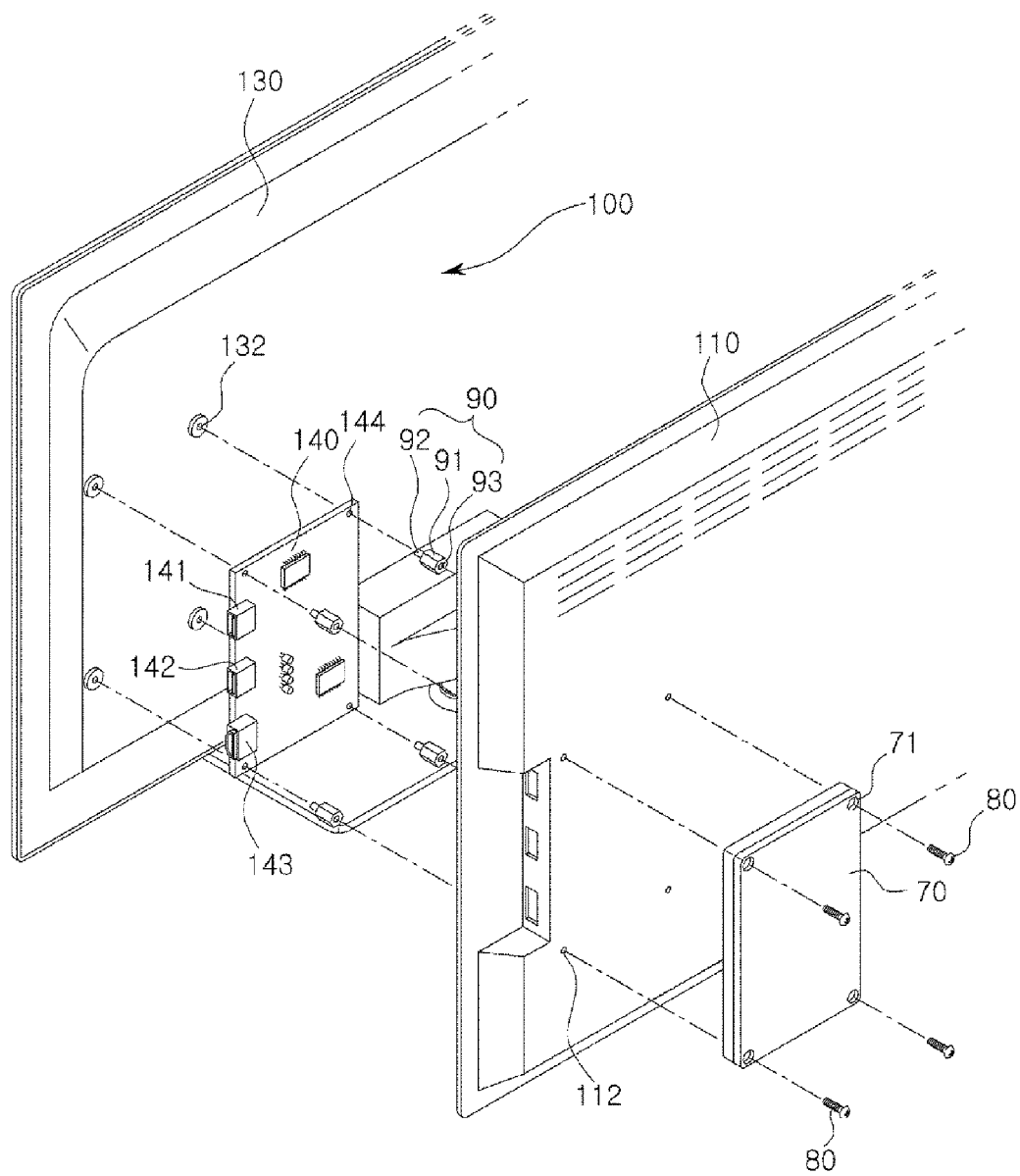
FIG. 17 is an exploded view illustrating coupling of an additional electronic unit to a television in accordance with another exemplary embodiment.

FIG. 17 is an exploded view illustrating coupling of an additional electronic unit 70 to a main body 100 of a television 1 in accordance with another exemplary embodiment.

As shown in FIG. 17, the additional electronic unit 70 is coupled to the main body 100 through fastening members 80 and 90. The fastening members 80 and 90 include a first fastening member 90 and a second fastening member 80. The first fastening member 90 and second fastening member 80 may form a male-female pair. That is, the second fastening member 80 may be fastened to the first fastening member 90.

To this end, the first fastening member 90 includes a body 92 and a head 91, and may further include a first fastening groove 93 allowing the second fastening member 80 to be coupled to the head 91. The head 91 may be arranged to extend from the body 92 and protrude to the outside of the body 92. The second fastening member 80 may also include a body and a head. However, the second fastening member 80 does not include a fastening groove as in the first fastening member 90. Accordingly, the second fastening member 80 is coupled to the first fastening groove 93 of the first fastening member 90.

According to the exemplary embodiment described in FIG. 17, the second fastening member 90 is coupled to a first coupling groove 132 provided on the front cover 130. However, exemplary embodiments are not limited thereto. The first coupling groove 132 and front cover 130 may be integrally formed through injection molding.

The printed circuit board 140 may include at least one printed circuit board coupling hole 144 allowing the first fastening member 90 to be fastened to the printed circuit board coupling hole 144. If the printed circuit board 140 is positioned between the rear cover 110 and the front cover 130, the body 92 of the first fastening member 90 is inserted into the first coupling groove 132 through the printed circuit board coupling hole 144. With the body 92 of the first fastening member 90 inserted in the printed circuit board coupling hole 144 and the first coupling groove 132, the head 91 of the first fastening member 90 protrudes to the outside of the printed circuit board 140 towards the rear cover 110. Accordingly, the first fastening member 90 is positioned between the rear cover 110 and the combination of the front cover 130 and the printed circuit board 140.

The rear cover 110 may be provided with at least one rear cover coupling hole 112 allowing the second fastening member 80 to be fastened to the first fastening groove 93 of the first fastening member 90. Also, the additional electronic unit 70 may be provided with at least one second coupling hole 71 allowing the second fastening member 80 to be fastened to the first fastening groove 93 through the at least one second coupling hole 71. Accordingly, the second fastening member 80 is inserted through the second coupling hole 71 of the additional electronic unit 70, and fastened to the first fastening groove 93 of the first fastening member 90 through the rear cover coupling hole 112 of the rear cover 110.

FIG. 17 shows four first fastening members 90 and four second fastening members 80, but exemplary embodiments are not limited thereto. At least one first fastening member 90 and second fastening member 80 may be provided. Also, corresponding to the number of the first fastening members 90 and second fastening members 80, at least one first coupling groove 132, printed circuit board coupling hole 144, rear cover coupling hole 112 and second coupling hole 71 may be provided.

Since the first fastening member 90 is positioned inside the main body 100, coupling the additional electronic unit 70 to main body 100 may be implemented through the second fastening member 80. Moreover, since a first fastening groove 93 is provided at the head 91 of the first fastening member 90, it may be possible to stably couple the additional electronic unit 70 to the main body 100.

Therefore, it may be possible to couple the additional electronic unit 70 to the main body 100 of the television 1 through fastening members such as screws, without altering the internal structure of the television. Further, efficient use of space in which the additional electronic unit 70 is positioned may be implemented without providing a separate space.

The exemplary embodiment shown in FIG. 17 illustrates that two different fastening members are used, but exemplary embodiments are not limited thereto. It is possible to use three different fastening members. That is, the male-female pair is formed not only by the first and second fastening members, but also by the second and third fastening members. That is, the third fastening member may be fastened to the second fastening member. In this case, the first fastening member is a female screw for the second fastening member, while the second fastening member is a male screw for the first fastening member and the second fastening member is also a female screw for the third fastening member, while the third fastening member is a male screw for the second fastening member.

In addition to the fastening members, the additional electronic unit may be coupled to a portion of the main body using a magnetic member. Also, the additional electronic unit may be coupled to the main body using an adhesive member such as glue and double-sided adhesive tape.

As is apparent from the above description, heat generated at electronic devices of an integrated circuit (IC) disposed on a printed circuit board may be dissipated to cool the ports, and thereby damage of the ports due to the generated heat may be prevented, and transfer of heat from the ports to the printed circuit board may also be prevented. Thereby, deformation of the printed circuit board due to heat and malfunction of the components mounted on the printed circuit board may be prevented and service life of the components may be extended.

Also, transfer of heat generated at the ports through the case may be minimized, and thereby deformation of the case may be prevented and unpleasantness caused when the heated case is touched by the user may be reduced. Since a separate fan or cooling device is not necessary to minimize the temperature increase in the ports, the cost for installation of a separate device may be saved, and an operational environment with no noise and no vibration may be realized.

While exemplary embodiments have been particularly shown and described above, it would be appreciated by those skilled in the art that various changes may be made therein without departing from the principles and spirit of the present inventive concept as defined by the following claims.

What is claimed is:

1. A television comprising:
a main body;
at least one port which is configured to connect a connector of an external electronic unit to the main body; and
at least one heat transfer member which is configured to receive and transfer heat from the at least one port,
wherein at least one face of the at least one port contacts the at least one heat transfer member,
wherein the at least one heat transfer member is integrally mounted to the at least one port,
wherein the at least one heat transfer member comprises:
a contact portion which contacts the at least one port; and
an extension portion which extends outward from the contact portion, and
wherein the at least one heat transfer member comprises:
an inserting portion into which the at least one port is inserted; and
an extension portion which extends outward from the inserting portion.

2. The television according to claim 1, wherein the at least one port includes a plurality of ports, and the at least one heat transfer member includes a plurality of inserting portions, wherein each of the plurality of ports is inserted into a respective inserting portion.

3. The television according to claim 2, wherein the plurality of inserting portions are integrated with one another.

4. The television according to claim 1, wherein one side of the at least one port positioned on a printed circuit board is exposed to an exterior of the main body.

5. The television according to claim 1, wherein the connector of the external electronic unit comprises a coupling protrusion which is configured to couple the connector of the external electronic unit to the main body.

6. The television according to claim 5, wherein the coupling protrusion is provided on one side of the external electronic unit, and is configured to be coupled to the at least one port provided on the main body.

7. The television according to claim 5, wherein the coupling protrusion is provided on a coupling member coupled to the external electronic unit, and is configured to be coupled to the at least one port provided on the main body.

8. A television comprising:
a main body;
an external electronic unit supported on a rear side of the main body; and
at least one port that is provided on a lateral side of the main body and is configured to input and output a signal,
wherein the external electronic unit is coupled to the main body through the at least one port, and
wherein the external electronic unit comprises a neck portion integrally formed with the external electronic unit and connecting the external electronic unit to the at least one port provided on the at least one side of the main body.

9. The television according to claim 8, wherein the at least one port is exposed to an outside of the main body through a through hole provided at the lateral side of the main body.

10. The television according to claim 8, further comprising a coupling protrusion which couples the external electronic unit to the main body, wherein the coupling protrusion is coupled to the at least one port provided on the one side the main body.

11. The television according to claim 10, wherein the coupling protrusion is integrated with the external electronic unit.

12. The television according to claim 10 further comprising a coupling member coupled to the external electronic unit,
wherein the coupling protrusion extends from one side of the coupling member.

13. The television according to claim 8 further comprising a printed circuit board provided inside the main body,
wherein the at least one port is coupled to one side of the printed circuit board.

14. The television according to claim 13, further comprising at least one heat transfer member which contacts at least one side of the port and is configured to receive and transfer heat generated at the at least one port.

15. A television comprising:
a main body;
a port which is configured to input and output data; and
a heat transfer member which contacts the port and dissipates heat generated at the port,
wherein a face of the port contacts the heat transfer member,
wherein the heat transfer member is integrally mounted to the port,
wherein the heat transfer member comprises:
a contact portion which contacts the port;
an extension portion which extends outward from the contact portion;
an inserting portion into which the port is inserted; and
an extension portion which extends outward from the inserting portion.

16. The television according to claim 15, wherein the heat transfer member is provided between a rear cover of the television and the port.

17. The television according to claim 15, wherein the extension portion is integrated with the contact portion and the extension portion does not contact the port.

18. The television according to claim 1, wherein the at least one heat transfer member contacts the at least one port to dissipate the heat from the at least one port via conduction.

19. The television according to claim 8, wherein the neck portion comprises an "L" shape and extends across the at least one side of the main body.

20. The television according to claim 14, wherein the at least one heat transfer member contacts the at least one port comprising at least one electrical connection port to dissipate the heat from the at least one port via conduction.

21. The television according to claim 15, wherein the heat transfer member dissipates the heat from the at least one port via conduction.

* * * * *